(12) United States Patent
Koch

(10) Patent No.: US 11,559,138 B2
(45) Date of Patent: Jan. 24, 2023

(54) WORKCELL

(71) Applicant: YAASA GmbH, Deutschlandsberg (AT)

(72) Inventor: Walter Koch, Schwanberg (AT)

(73) Assignee: YAASA GmbH, Deutschlandsberg (AT)

( * ) Notice: Subject to any disclaimer, the term of this patent is extended or adjusted under 35 U.S.C. 154(b) by 65 days.

(21) Appl. No.: 17/253,887

(22) PCT Filed: Jun. 13, 2019

(86) PCT No.: PCT/EP2019/065567
§ 371 (c)(1),
(2) Date: Dec. 18, 2020

(87) PCT Pub. No.: WO2019/243166
PCT Pub. Date: Dec. 26, 2019

(65) Prior Publication Data
US 2021/0259404 A1  Aug. 26, 2021

(30) Foreign Application Priority Data

Jun. 19, 2018 (DE) ...................... 10 2018 114 659.0

(51) Int. Cl.
*A47B 21/02* (2006.01)
*F16M 11/04* (2006.01)
*F16M 11/18* (2006.01)

(52) U.S. Cl.
CPC ........... *A47B 21/02* (2013.01); *F16M 11/046* (2013.01); *F16M 11/18* (2013.01);
(Continued)

(58) Field of Classification Search
CPC ...... F16M 11/046; F16M 11/18; F16M 11/08; F16M 2200/025; A47B 21/02;
(Continued)

(56) References Cited

U.S. PATENT DOCUMENTS 5,128,838 A * 7/1992 Brandess ................ F21V 17/02
362/18
5,438,457 A * 8/1995 Moore ..................... B60R 1/006
359/872

(Continued)

FOREIGN PATENT DOCUMENTS

DE        3607365 A1    9/1987
DE        29505530 U1   6/1995
(Continued)

OTHER PUBLICATIONS

International Search Report dated Jul. 22, 2019 in connection with PCT/EP2019/065567.

*Primary Examiner* — Eret C McNichols
(74) *Attorney, Agent, or Firm* — Eschweiler & Potashnik, LLC

(57) ABSTRACT

A workcell comprises a base structure, a column having a lower part connected to the base structure and an upper part which is height-adjustable relative to the lower part. A first and a second support structure are mechanically connected to the upper part of the column via a first and a second joint element to allow axial rotation of the support structures around the column. At least one of the joint elements comprises a latching mechanism configured to block movement of the joint element with respect to the column in a normal state and to release movement of the joint element during an adjustment operation initiated by a user of the workcell.

17 Claims, 7 Drawing Sheets

(52) U.S. Cl.
CPC ... *A47B 2200/0056* (2013.01); *A47B 2200/12* (2013.01); *A47B 2220/0077* (2013.01); *F16M 2200/025* (2013.01)

(58) Field of Classification Search
CPC ........ A47B 2200/0056; A47B 2200/12; A47B 2200/0077
See application file for complete search history.

(56) References Cited

U.S. PATENT DOCUMENTS

| | | | |
|---|---|---|---|
| 5,630,566 A | 5/1997 | Case | |
| 5,675,946 A | 10/1997 | Verbeer | |
| 5,704,298 A | 1/1998 | Corpuz, Jr. | |
| 5,803,562 A | 9/1998 | Jacobs | |
| 5,918,841 A * | 7/1999 | Sweere | A47B 21/00 248/281.11 |
| 6,012,693 A | 1/2000 | Voeller | |
| 6,394,402 B2 | 5/2002 | Coonan | |
| 6,397,761 B1 | 6/2002 | Moore | |
| 6,419,511 B2 * | 7/2002 | Lizell | A47B 21/06 439/210 |
| D476,509 S * | 7/2003 | Orsino | F16M 11/24 D14/447 |
| 6,598,839 B2 * | 7/2003 | Loughman | F16M 11/2014 40/658 |
| 7,152,358 B1 | 12/2006 | Leanna | |
| 7,663,478 B2 | 2/2010 | Oh | |
| 7,922,249 B2 | 4/2011 | Marchand | |
| 7,990,691 B2 | 8/2011 | Clark | |
| 8,162,268 B1 * | 4/2012 | Huang | F16M 11/2085 248/920 |
| 8,282,052 B2 * | 10/2012 | Huang | F16M 11/24 248/125.1 |
| 8,602,366 B2 * | 12/2013 | Chen | F16M 13/02 248/125.7 |
| 8,602,367 B2 * | 12/2013 | Wang | F16M 11/08 248/125.7 |
| 8,939,500 B2 | 1/2015 | Voigt | |
| 9,016,213 B2 | 4/2015 | Tajbarhsh | |
| 9,220,348 B2 | 12/2015 | Stieler | |
| 9,375,626 B2 * | 6/2016 | English | A63B 21/072 |
| 9,433,288 B2 | 9/2016 | Voigt | |
| 9,470,357 B2 | 10/2016 | Hazzard | |
| 9,596,929 B2 | 3/2017 | Roulizakis | |
| 9,632,900 B1 | 4/2017 | Gildein, II | |
| D789,105 S | 6/2017 | Voigt | |
| 9,808,092 B2 | 11/2017 | Kipling | |
| 9,884,427 B2 | 2/2018 | Low | |
| 9,889,568 B2 | 2/2018 | Kilroy | |
| 9,907,396 B1 | 3/2018 | Labrosse | |
| 9,921,726 B1 | 3/2018 | Sculley | |
| 10,753,531 B2 * | 8/2020 | Huang | F16M 11/08 |
| D927,893 S * | 8/2021 | Hoffman | B62B 3/12 D6/648 |
| 11,076,687 B2 * | 8/2021 | Blewett | B62B 3/12 |
| 2002/0066837 A1 * | 6/2002 | Dunbar | H04R 1/083 248/125.7 |
| 2004/0154262 A1 | 8/2004 | Jaroff | |
| 2006/0096505 A1 | 5/2006 | Sykes | |
| 2006/0158836 A1 * | 7/2006 | Phillips | A47C 7/723 361/679.22 |
| 2013/0026312 A1 * | 1/2013 | Wang | F16M 11/08 248/125.7 |
| 2013/0270404 A1 | 10/2013 | Prince | |
| 2015/0120377 A1 | 4/2015 | Marvit | |
| 2017/0172698 A1 | 6/2017 | Charles | |
| 2019/0353297 A1 * | 11/2019 | Huang | F16M 11/08 |
| 2020/0138184 A1 | 5/2020 | Swartz | |

FOREIGN PATENT DOCUMENTS

| | | | |
|---|---|---|---|
| DE | 20209603 U1 | 9/2002 | |
| DE | 20317193 U1 | 4/2004 | |
| DE | 20317193 U1 * | 5/2004 | ......... A47B 21/0314 |
| EP | 9168158 A2 | 1/1986 | |
| GB | 1599064 A * | 9/1981 | ............ A47B 19/00 |
| WO | 9013240 A1 | 11/1990 | |
| WO | 9962375 A1 | 12/1999 | |
| WO | 2008009087 A1 | 1/2008 | |
| WO | WO-2008009087 A1 * | 1/2008 | ............ A47B 21/02 |
| WO | 2016128765 A1 | 8/2016 | |

* cited by examiner

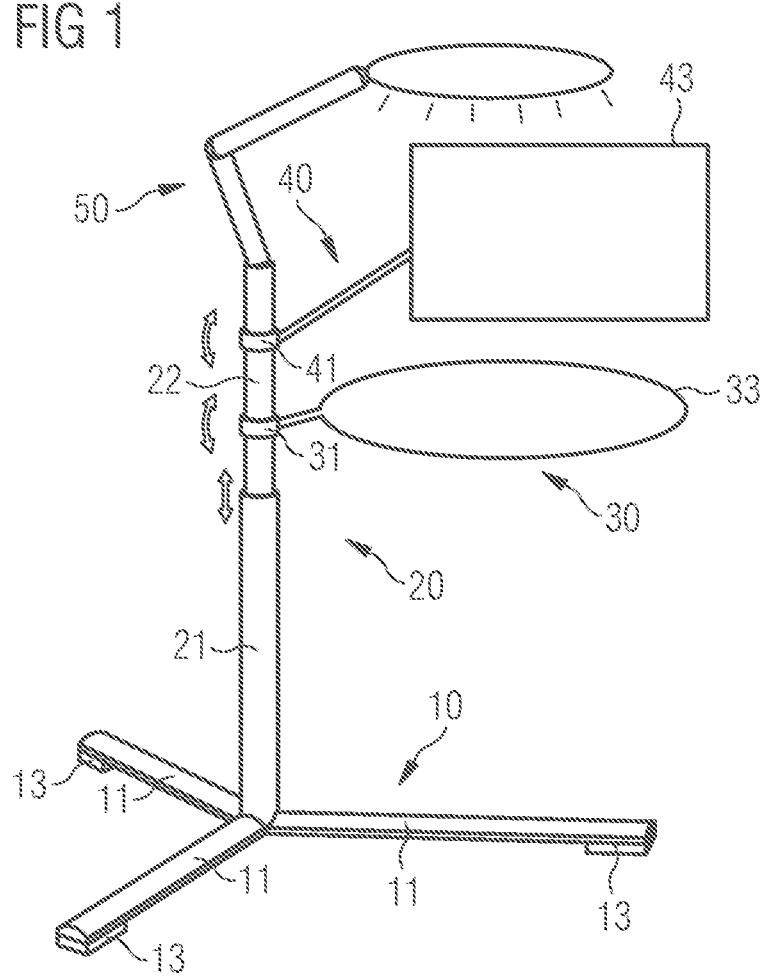
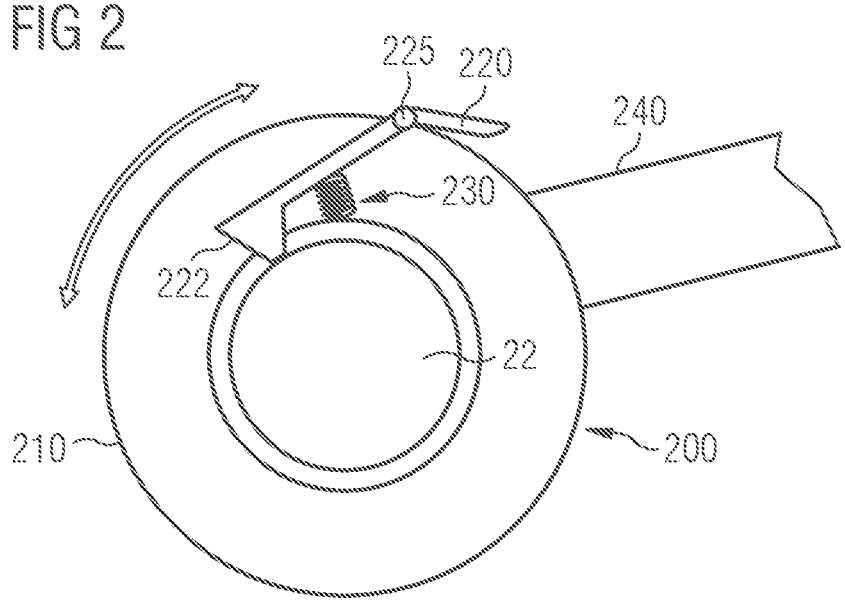

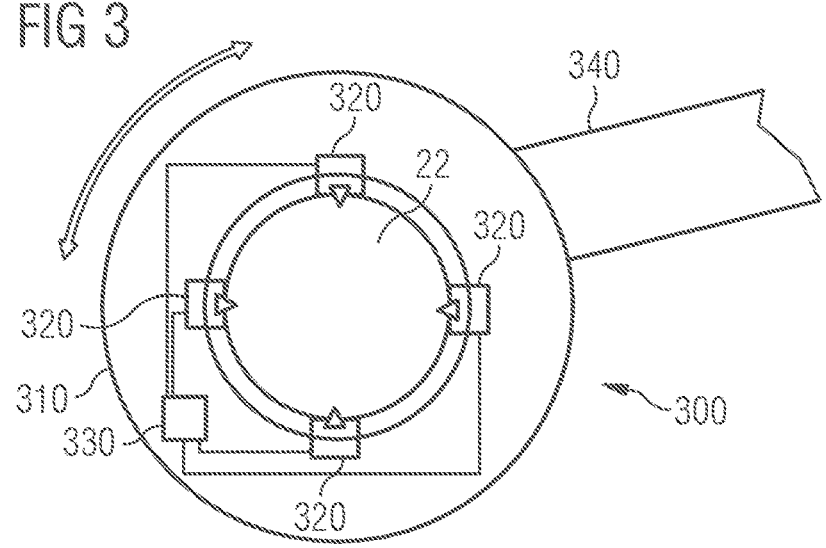
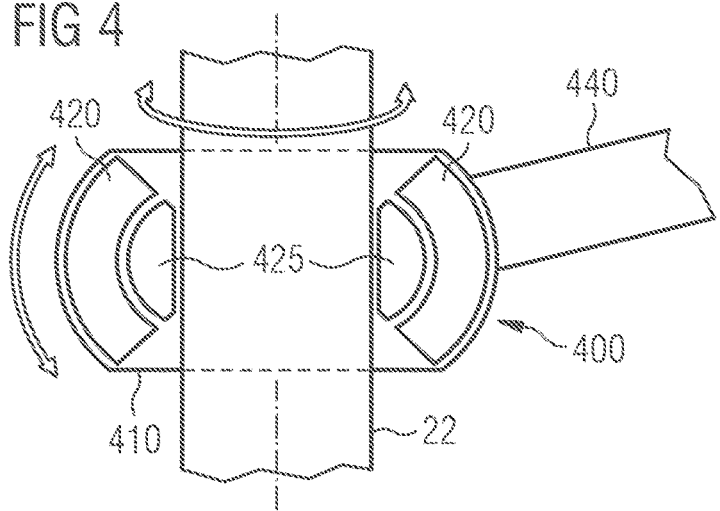
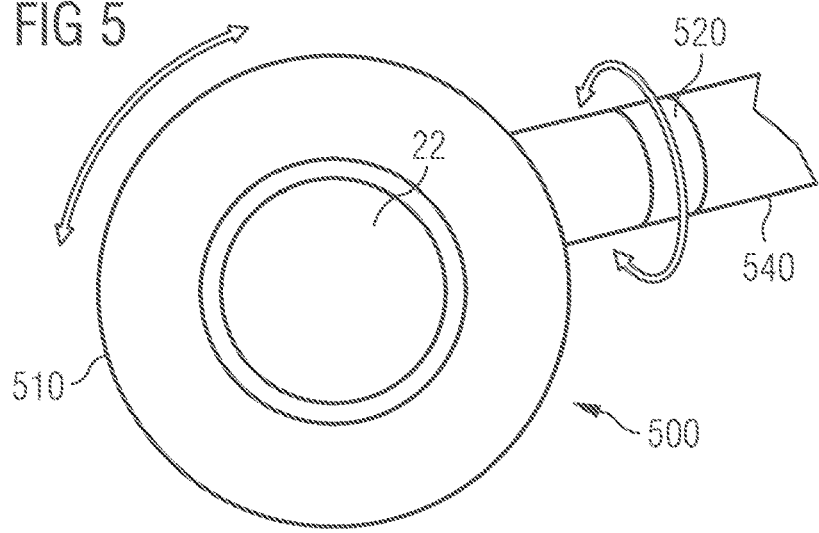

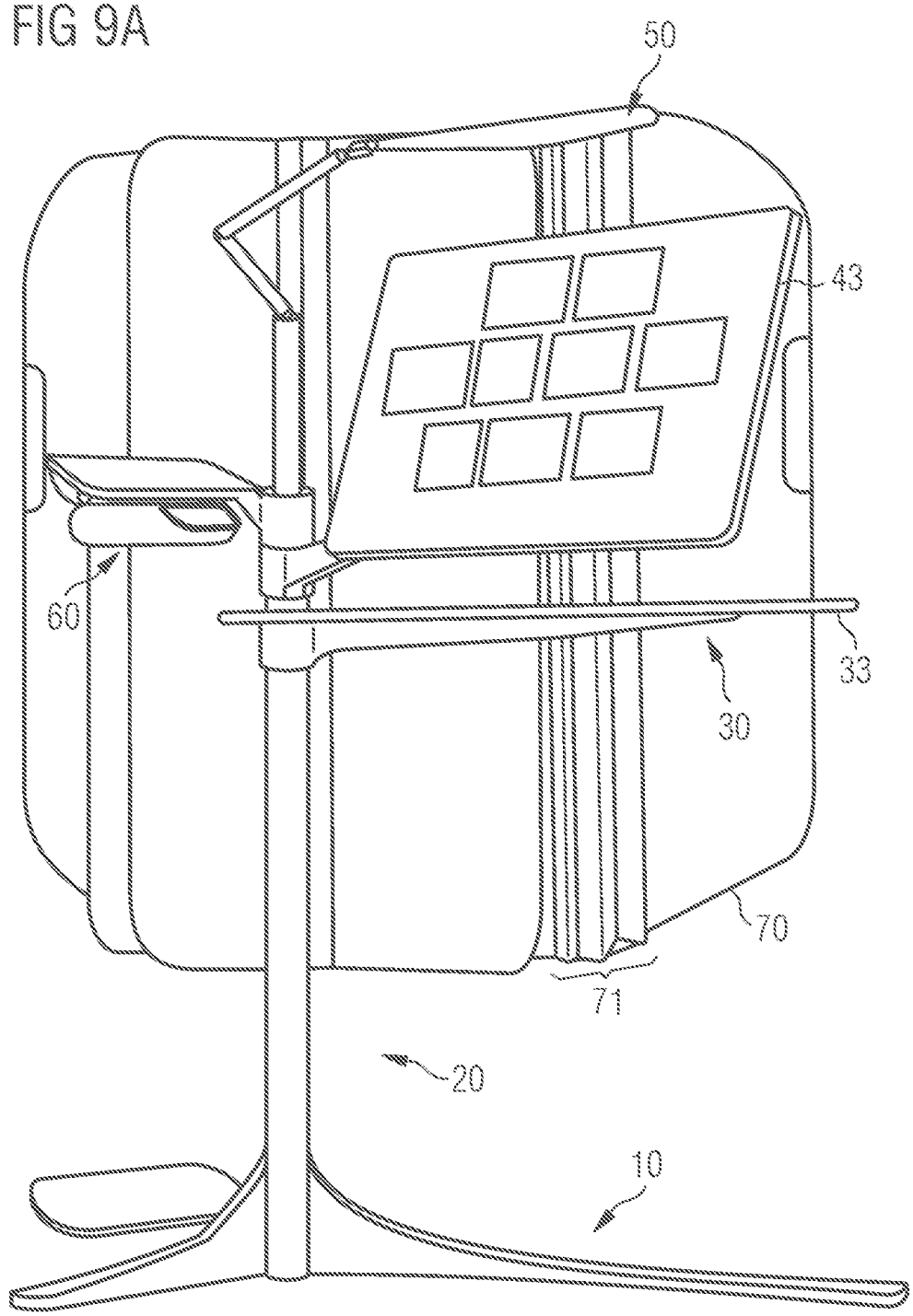

WORKCELL

REFERENCE TO RELATED APPLICATIONS

This application is a National Phase entry application of International Patent Application No. PCT/EP2019/065567 filed Jun. 13, 2019, which claims priority to DE 10 2018 114 659.0 filed on Jun. 19, 2018, the contents of which are herein incorporated by reference in its entirety.

The present disclosure concerns a workcell, in particular as an office workstation system.

BACKGROUND OF THE INVENTION

In offices or similar work environments, it is now common practice to design workstations in the form of desks that are height-adjustable, so that the users of the workstations can adjust the height of the work surface to their needs. In addition to an ergonomic setting for the correct height when working in a seated position, the height adjustment also allows working in a standing position.

However, regardless of the type of use, such conventional workstations always require a large usable area within an office landscape. Moreover, such conventional workstations are designed and configured for a single user only, so that flexible collaboration with other employees is not possible or only possible with severe limitations.

SUMMARY OF THE INVENTION

The present disclosure provides an improved workcell concept that requires less floor space and is characterized by flexibility.

The improved workcell concept is based on the idea to build a workcell according to a tree principle with a trunk, which is height adjustable, e.g. electrically height-adjustable. Different working units are connected to the trunk, in principle like branches and leaves. The working units are at least partially attached to the trunk by means of rotating joints and can be locked or latched if this is advantageous for the function of the working unit. The work units are formed, for example, by work surfaces such as a table, shelves, mountings for a monitor or touch-sensitive screen or the like. The various work units are, for example, supported by supporting structures. The trunk, for example in the form of a column, especially a telescopic column, is advantageously supported on a base structure with at least three supporting surfaces, especially for ground contact.

In an implementation form of the improved workplace concept, a workcell comprises, for example, a base structure with three support surfaces, e.g. for ground contact, and a column with a lower part connected to the base structure and an upper part which is height-adjustable, e.g. electromechanically height-adjustable, with respect to the lower part. A first support structure is mechanically connected to the upper part of the column via a first joint element, the first joint element allowing axial rotation of the first support structure around the column. Similarly, at least one second support structure is mechanically connected to the upper part of the column via a second joint element, the second joint element allowing axial rotation of the second support structure. At least one joint element of the first and second joint elements comprises a latching mechanism configured to block movement of the joint element with respect to the column in a normal state and to release the movement of the joint element during an adjustment process initiated by a user of the workcell.

For example, different working units can be attached to the support structures, whereby their selection is basically flexible and can be adapted to the individual needs of the user. This particularly applies to changes in the working behavior of the user, where individual working units can be replaced by other working units. However, it is conceivable, for example, that a panel, e.g. a tabletop, is attached to the first support structure and/or that a mounting for a monitor is attached to the second support structure.

Such a workcell addresses the needs for privacy in open-plan offices as well as ergonomics and dynamic interaction in concentrated work by individuals, but also meetings in small groups. In the light of progressive digitalization in the office, which is gradually reducing the use of paper while at the same time increasing office sensitive screen diagonals, a workcell in accordance with the improved workplace concept offers an increase in the degrees of freedom with regard to the possible adaptation to modern work situations. These include focused individual work in a sitting or standing position with input from a mouse and keyboard, for example, or operation by touching the screen surface with a finger, but also meetings in small groups in which the screen is used as an interactive medium and the tabletop can be moved into the background or rotated.

The single-column design increases the flexibility of the workcell compared to conventional table systems, where several columns or entire frame constructions must be used.

The simple design with only one column also makes it easier to relocate the workcell between different working positions.

This can also be supported, for example, by the fact that the base structure, especially in or on the support surfaces, has rollers with which the workcell can be moved.

The height adjustment of the column not only allows the height to be adapted to the use of the workstation, either as a standing or sitting workstation, but also to compensate for differences in size between different users.

In a further development stage, the workcell can be equipped with wheels or castors equipped with electromechanical drives in order to automate the flexibility of the local installation or at least to support the user during the adjustment.

The latching mechanism of the joint elements can be included in one, in both or, if further support structures are attached to the column via joint elements, also in the other joint elements. The latching mechanism ensures that any adjustment of the respective joint element remains unchanged, unless the user intends and/or releases an adjustment. In particular, the latching mechanism has the effect that a stable, and in particular an angular stable position is maintained for a work unit attached to the associated support structure, e.g. a plate or a screen holder. For some work situations or work units, however, it may also make sense to omit or at least deactivate the latching mechanism in the joint element in order to be able to adjust the respective work unit more easily.

For example, blocking the movement of the joint element in the latching mechanism is automatic and/or self-locking.

For example, the latching mechanism comprises at least one spring element which causes the movement of the joint element to be blocked. This effect can occur directly or indirectly, for example by the spring element acting on another mechanical element which inhibits and/or blocks the movement or rotation.

Alternatively or additionally, the latching mechanism comprises at least one electromechanical element which causes the blocking and release of the movement of the joint element.

In principle, the blocking of the movement can be achieved, for example, by increasing the friction between the moving components, by engaging a toothing or a pin or a cotter pin.

Irrespective of the presence of a latching mechanism, the first and/or the second or, if necessary, further joint elements are configured for electromechanical rotation or movement in various embodiments. Adjustment can, for example, be carried out directly or indirectly via an electric motor. The possibilities and characteristics of the joint element or the latching mechanism described above allow the formation of different types of working units on the support structures.

In one embodiment, for example, manual mechanical adjustment is effected by the user's force and a holding mechanism in the form of the latching mechanism, for example by spring action.

In another embodiment, for example, manual mechanical adjustment is achieved by the user applying force with a holding or latching mechanism by means of the latching or braking action of an electromechanical device in the joint elements of the configuration.

In a further embodiment, adjustment is performed by means of an electromechanical drive in completely automatic or user-assisted operation, whereby a locking and/or braking effect is achieved by mechanisms in the joint element itself.

For such a user-assisted operation, the workcell comprises respective sensors that detect an adjustment process initiated by the user. For example, tactile sensors are provided for this purpose, by which the user can signal a movement in a certain direction. Alternatively, sensors, e.g. motion sensors, can be provided in the joint element and/or in the associated support structure, which detect a mechanically initiated movement or an adjustment process of the user and, depending on this, control and regulate the adjustment and/or locking. The motion sensors are, for example, designed as inclination sensors and/or acceleration sensors or gyro sensors.

The sensors used can also include optical sensors, such as imaging sensors like 2D or 3D camera sensors. Such sensors can be used to detect and evaluate, for example, a user's movements or gestures in order to initiate or support adjustment processes.

In the embodiments described so far, the joint elements only allow the support structures to be rotated around the axis of the column. For different work situations, however, it may be useful to enable further adjustment parameters or degrees of freedom for the adjustment.

In various advanced implementations of the workcell, the first and/or the second joint elements allow axial rotation of the first and second support structures about at least one further axis, which is at an angle, e.g. a right angle, to the column. This allows additional adjustment of the work unit attached to the respective support structure.

In such implementations, the respective latching mechanism is configured to block movement of the joint element with respect to the further axis in a normal state and to release the movement of the joint element with respect to the further axis during an adjustment process initiated by a user of the workcell.

The movement around several axes can be realized in a single joint of the joint element, but also by several joints, which are contained or combined in the joint element. Joint elements, which allow further degrees of freedom, can also be used.

In various implementations of the workcell, the first and/or the second joint element comprises a stabilizing element, which is configured to compensate a spatial position of the associated support structure with respect to movements, inclinations or vibrations of the column and/or the associated support structure. Such movements, inclinations or vibrations of the column and/or the associated support structure can also result from movements, inclinations or vibrations of the other components attached to the column, such as the foot section. In general, any movements, inclinations or vibrations in the workcell system can thus be compensated.

The stabilizing element, for example, is designed electromechanically and contains both appropriate sensor technology to detect movements, inclinations and/or vibrations of the column and/or the associated support structure, and motor technology to compensate for these. The sensors can be contained in the joint element or in the stabilizing element, but can also be attached externally, for example to the support structure. Thus, the assigned support structure and/or work units attached to it can be kept in a stable position for the user.

In various designs, at least one of the support structures comprises a further joint element, which is arranged at a distance from the column. This further increases the adjustment possibilities of the respective support structure. For example, a further joint element, whose axis of rotation is parallel to the column, can be used to vary the distance between the working unit, which is attached to the support structure, and the column. If the respective joint element on the column allows further directions of movement in addition to the rotation around the column, the further joint element can be configured for a parallel movement to it, for example, in order to compensate for inclinations and to establish or maintain parallelism to the floor or the support of the workcell, so to speak.

For example, the further joint element comprises a further latching mechanism that is configured to block movement of the further joint element in the normal state and to release the movement of the further joint element during an adjustment process initiated by the user. The latching mechanism can be designed in analogy to the latching mechanisms described above.

In various embodiments, the upper part can be designed essentially in one piece. In alternative embodiments, the upper part comprises a first piece and at least one second piece, which is mechanically coupled with the first piece. The first piece forms with the lower part an arrangement for height adjustment. The first and second joint elements are attached to the second piece. The preferably telescopic arrangement for height adjustment allows the upper part to be height-adjustable in relation to the lower part.

This implementation makes it possible, for example, that the first piece and the lower part, as components of the height adjustment system, can be directly matched to each other with respect to their size. Additionally, it does not matter whether the upper or the lower component of the height adjustment arrangement comprises a larger size or includes the other component. Thus, both variants, larger circumference below or larger circumference above, are possible.

In various embodiments, the workcell also includes a lamp element which is attached to the upper part of the column, e.g. it is movably mounted. For example, the lamp element is attached to a free end of the upper part, especially in the axial direction of the column. Alternatively, the lamp element, like the support structures, is attached to the upper part by a corresponding joint element. The lamp element can be hinged to the column in various ways to allow individual adjustment of the lamp element or the illumination it contains.

In various embodiments, the workcell also includes a privacy screen element which is attached to the column. The attachment is e.g. rotatable, in particular via an additional joint element. The privacy screen element is designed, for example, foldable and/or with sections that can be moved towards each other, for example fan-like, in order to be able to adapt the dimensions of the cover to the respective work situation. Preferably, the visual protection element is curved, so that visual protection around the axis is possible. The privacy screen element can also be used as an additional acoustic protection, which allows undisturbed work in the workcell. For example, the visual protection element includes a construction for screening, which is made of a combination of plastic or metal and a textile fabric.

In various embodiments, the workcell also includes a control system. The control is configured, for example, to control a movement of at least one of the joint elements in response to the user's actuation of sensors. Alternatively or additionally, the control is configured to follow a movement of one of the joint elements and/or one of the support structures initiated by the user on the basis of at least one signal from a movement sensor of the workcell. Such a motion sensor is for example a tilt sensor and/or an acceleration sensor and/or a gyro sensor. Furthermore, alternatively or additionally, the control can be configured to set stored configurations of at least one of the joint elements and/or at least one of the support structures in response to a selection by the user.

Further possibilities for the use of the control are not excluded thereby. In particular, the control system can also be used to adjust the height of the column, if an electromechanical drive is provided, and/or to control other components connected to the workcell, such as the lamp element. For this purpose, simple tactile sensors can also be provided, which are evaluated by the control system. However, height adjustment and/or the control of further components can also be implemented in a separate control which is at least partially independent of the control of the joint elements.

The improved workstation concept described above results in a transition of the workstation system from a 2-dimensional adjustment (pure vertical adjustment of the table top and monitor height) to a 3-dimensional adjustment of the table top and monitor support in vertical height and horizontal distance. This allows for example touch-sensitive monitors to be used more efficiently in individual workstations. Furthermore, effective meetings in small groups are enabled and stimulated by the interactive use of monitors.

An optional integrated shelf system allows the user to place personal items such as a smartphone, wallet or other personal belongings. The shelf system can be designed in different versions and is attached to the vertical column. Alternatively or in addition, the shelf system can also be attached to one of the other components attached to the column, such as the base or support structure and/or a work unit attached to it.

In order to give the user a feeling of privacy through an opaque privacy screen and insulation of acoustic disturbances, a tensioned construction, the privacy screen element, is attached to the column structure. This privacy screen element can be made of different materials and can vary in size. It can also consist of several parts that can be moved in relation to each other, for example in a fan-like manner. Likewise, the visual protection element can comprise foldable sections. In addition, depending on the design, it may be possible to rotate the privacy screen element around the pivot point of the column suspension and/or to change its curvature or length.

In summary, the improved workstation concept enables the provision of a workstation which offers the user a work surface, a display component such as a screen, storage possibilities and privacy together in a compact and modular design.

In the following, the invention is explained in detail by means of exemplary embodiments with reference to the drawings. Components which are functionally identical or have an identical effect may be provided with identical reference marks. Identical parts or parts with identical function may be explained only with reference to the figure in which they first appear. The explanation is not necessarily repeated in subsequent figures.

BRIEF DESCRIPTION OF THE DRAWINGS

In the drawings:

FIG. 1 shows a schematic representation of an example of a workcell according to the improved workstation concept;

FIG. 2 shows an example of a latching mechanism in a joint element;

FIG. 3 shows another example of a latching mechanism in a joint element;

FIGS. 4 and 5 show different examples of joint elements with additional degrees of freedom;

FIG. 8, FIGS. 9A and 9B and FIGS. 10A and 10B show different views of examples of a workcell.

DETAILED DESCRIPTION

Figure 6:
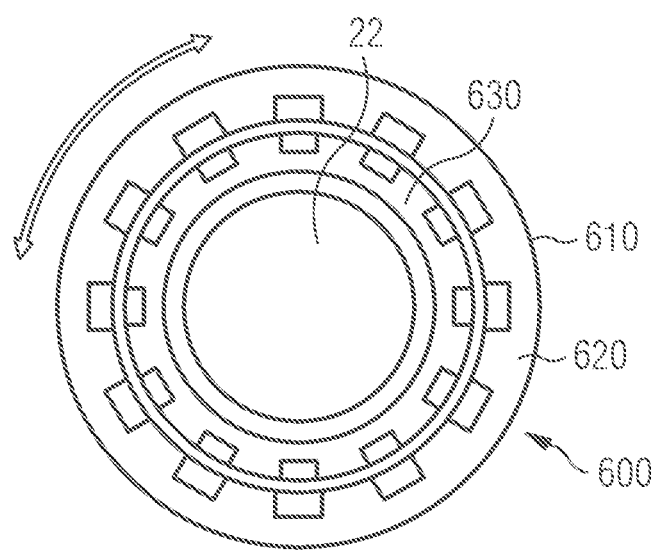
FIG. 6 shows an example of a joint element with electric motor drive.

FIG. 1 shows an exemplary embodiment of a workcell according to the improved workplace concept. The workcell comprises a base structure 10, which is formed by three struts or arms 11 and support surfaces 13 attached to them. However, instead of three support surfaces, more support surfaces or more struts with support surfaces can be provided.

A column 20 is attached to the base structure 10, whereby in particular a lower part 21 of the column 20 is connected to the base structure 10. An upper part 22 of the column 20 is height-adjustable with respect to the lower part 21, whereby the height adjustment is carried out hydraulically and/or electromechanically, for example. For this purpose, regulated or controlled electric motors, e.g. DC motors or brushless DC motors, can be used. The column 20, for example, is designed as a telescopic column.

A first support structure 30 and a second support structure 40 are attached to the column 20, on which different working units can be mounted. In the example shown, the first support structure 30 has a panel, e.g. a table top 33, attached to it, while a screen 43 is mounted on the second support structure 40. The two support structures 30, 40 are mechanically connected to the upper part 22 of the column 20 by respective joint elements 31, 41, whereby the joint elements 31, 41 each allow axial rotation of the support structures 30, 40 around the column 20. The workcell further comprises a lamp element 50, which is attached to the upper part 22 of the column 20. In the embodiment shown, the lamp element 50 is equipped with several joints to enable variable adjustment of the illumination.

In addition to the two support structures 30, 40 and the associated joint elements 31, 41, further support structures with corresponding joint elements can also be attached to the upper part 22 of the column 20.

One or both of the two joint elements 31, 41 additionally comprise a latching mechanism that is configured to block movement of the joint element 31, 41 with respect to the column 20 in a normal state and to release the movement of the joint element during an adjustment process initiated by a user of the workcell. This prevents unintentional adjustments of the respective support structure.

Such a latching mechanism is particularly useful in the case of joint element 41, which is used to attach the second support structure to screen 43, thus preventing the screen from being adjusted without the user's intervention.

Alternatively, none of the joint elements 31, 41 comprises a latching mechanism, so that the axial rotation of the support structures 30, 40 is basically possible. In such a case, however, a corresponding latching mechanism can be provided in another joint element not shown here, which is located at a distance from column 20 in a support structure, for example in support structure 40 for a monitor. This allows the screen 43 to be rotated around the column 20, but otherwise prevents unintentional adjustment.

The latching mechanism can automatically and/or self-lockingly block the movement of the joint element. Thus, for example, a movement or adjustment can only take place by actively acting on the latching mechanism.

The column 20 is shown in FIG. 1 as a telescopic column, where the lower part 21 comprises a larger circumference than the upper part 22 and encloses it.

The upper part 22 can be essentially a single piece in such an embodiment. In a retracted position of the column 20, i.e. at the lowest height, a section of the upper part 22 protrudes from the lower one, to which section the joint elements 31, 41 and the optional lamp element 50 are attached.

Alternatively, the upper part is formed with at least two pieces. For example, a first piece or section is part of a height adjustment assembly, while a second piece or section is attached or mechanically coupled to the first piece or section. The joint elements 31, 41 and the optional lamp element 50 are attached to this second section. The second section acts, for example, as an extension of the preferably telescopic arrangement for height adjustment, which is formed by the lower part 21 and the first piece or section.

The above mentioned alternative with the additional piece or section allows that the first piece and the lower part 21 as components of the telescopic height adjustment device can be directly matched to each other with regard to their size. In addition, it does not matter whether the upper or the lower component of the telescopic height adjustment system comprises a larger circumference or includes the other component. Thus both variants, larger circumference below or larger circumference above, are possible.

FIG. 2 shows a potential embodiment of a joint element 200 with such a latching mechanism, which can be used in the workcell of FIG. 1. The joint element comprises an outer part 210, which can rotate around the upper part 22 of the column via a bearing not shown in detail. For the latching mechanism, for example, a lever 220 is provided with which a pin or journal can be unlocked and locked to prevent rotation of the joint element 200. For example, the lever for this purpose is rotatably mounted at point 225 and is pretensioned via a spring element 230 in such a way that the latching mechanism is released only by pressure on the outer part of the lever 220 and that it is automatically re-engaged when no pressure is applied. An arm or carrier 240 is attached to the joint element 200, which extends further into the carrier structure not shown here.

FIG. 3 shows another exemplary embodiment of a joint element which can be used in the arrangement shown in FIG. 1. Similar to the joint element 200 in FIG. 2, the joint element 300 comprises a rotatable outer part 310 which can be rotated around the upper part 22 via a bearing not shown. A carrier 340 is mounted on the joint element 300 which, like the carrier 240, extends in a carrier structure not shown. The joint element 300 is equipped with electrical or electromechanical latching actuators 320, which are controlled by a corresponding control element 330 in order to trigger or terminate the latching action. Thus, the actuators 320 can be used to block or release a movement of the joint element with respect to the column.

FIG. 4 shows an implementation of a joint element 400, which in turn can be used in the version shown in FIG. 1. The joint element 400 again comprises an outer part 410, which can be rotated around the upper part 22 of the column 20. In addition, elements 420 and 425 are provided which allow the joint element 400 to be rotated around an axis perpendicular to column 20. The joint element 400 thus comprises at least two degrees of freedom in movement, since a further axis of rotation is provided in addition to the column itself. The carrier 440 corresponds in its function to the carriers 240, 340 of the preceding figures.

A latching mechanism for the two directions of movement of the joint element 400 is not shown for reasons of clarity, but it is possible to provide for it.

FIG. 5 shows a further embodiment of a joint element 500 which can be used in the workcell according to FIG. 1. Initially, the joint element 500 comprises an outer part 510 which can rotate around the upper part 22, similar to the designs described above. In addition, a further joint 520 is provided in or on a carrier 540, which extends further into a carrier structure. Thus, the joint element 500 comprises at least two degrees of freedom of movement, similar to joint 400, since a further axis of rotation is provided in addition to the column itself. Again, various forms of latching mechanisms can be used, which are not shown here for reasons of clarity.

FIG. 6 shows a joint element 600 for use in a workcell according to FIG. 1, which comprises a part 610 with an outer part 620 and an inner part 630, whereby the outer part 620 is mounted so that it can rotate around the inner part 630 and the upper part 22 of the column 20 respectively. Parts 620 and 630 together form an electric motor, which is shown here only schematically, with part 630 serving as stator and part 620 as rotor.

The design of the electric motor allows automatic or user-controlled adjustment of the respective support structure. A control of the motor and other necessary components are not shown for reasons of overview.

Depending on the design of the motor, the motor can effect the rotational adjustment of the joint element 600 directly, i.e. in particular without a gearbox. For a high accuracy in setting the angle of rotation, precise control of the motor is advantageous.

Alternatively, a gear, especially a planetary gear or a worm gear can be provided to convert a rotary motion of the motor into a preferably reduced rotary motion of the joint element 600.

Figure 7:
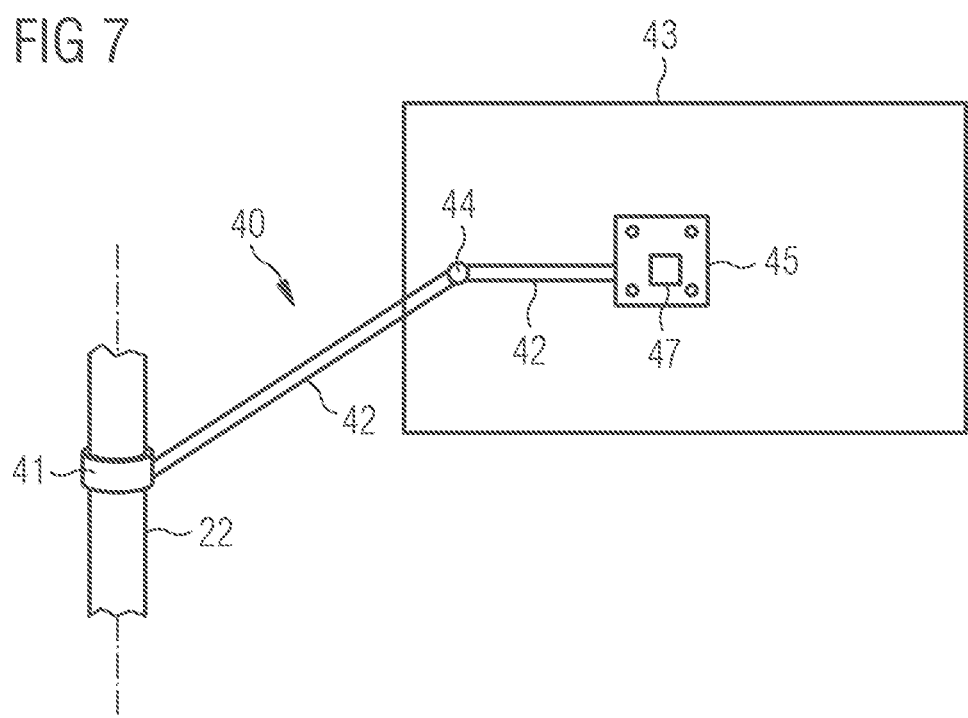
FIG. 7 shows a detail of an example of a workcell with a stabilizing element.
Figure 8:
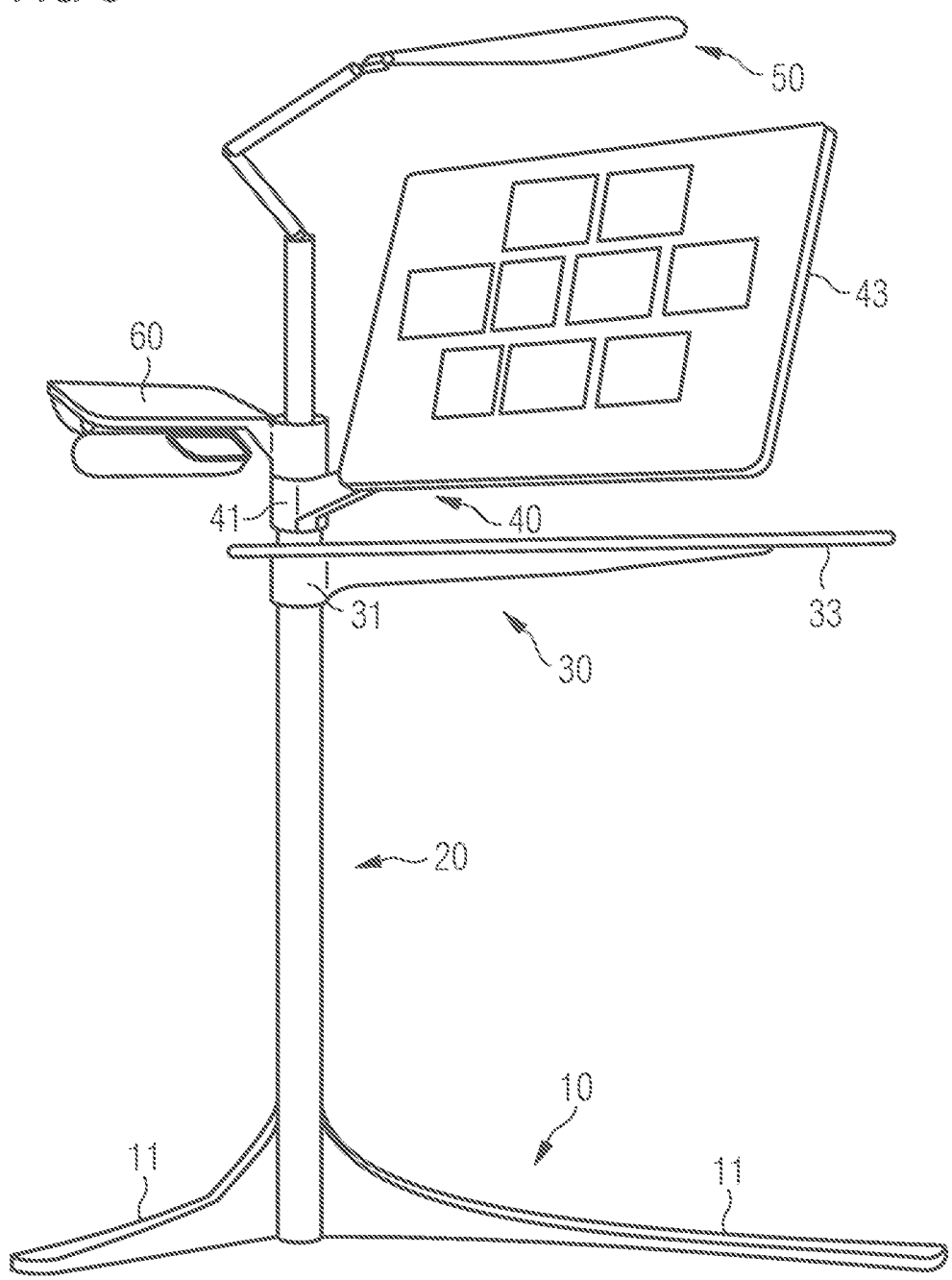
Figure 9B:
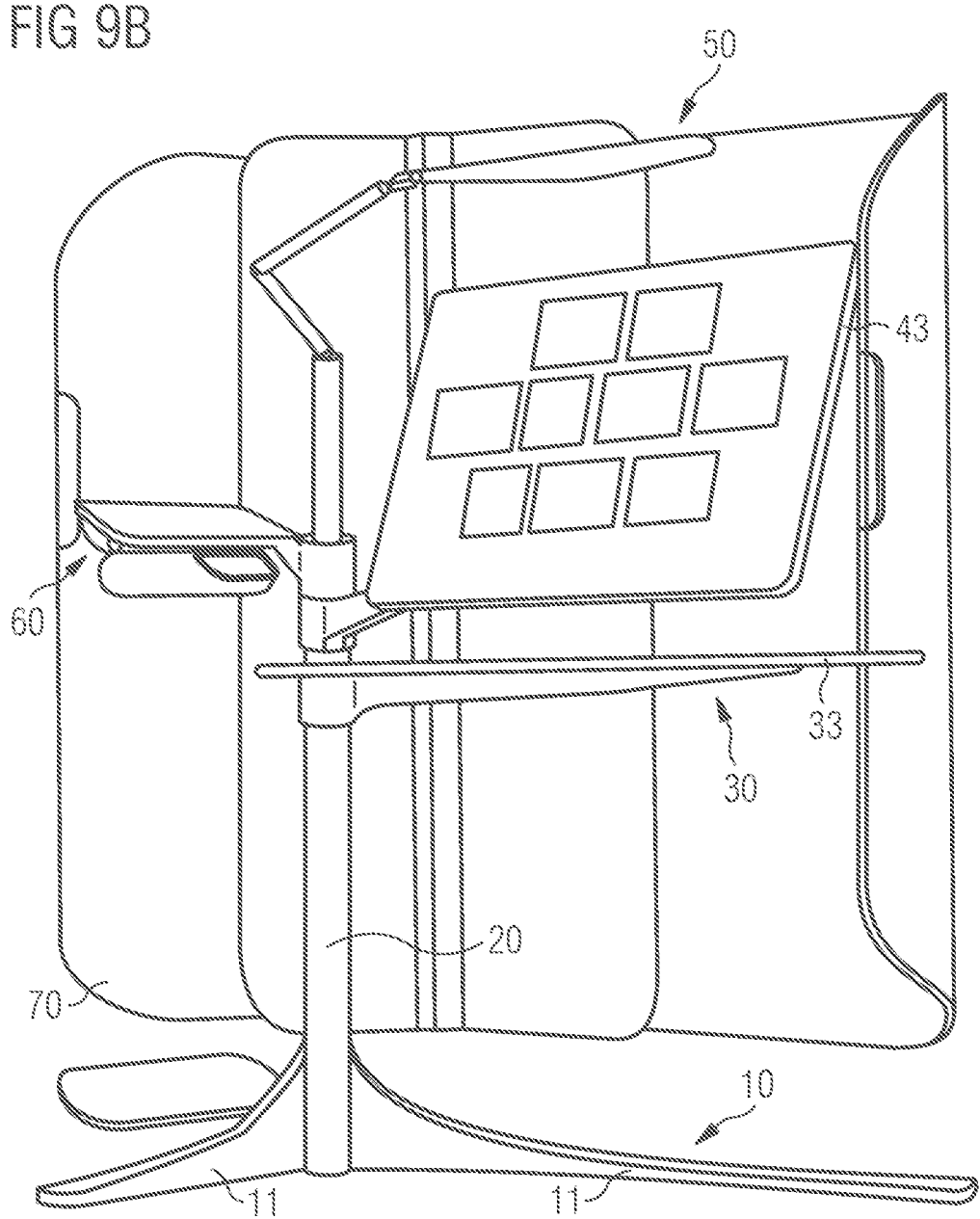
Figure 10A:
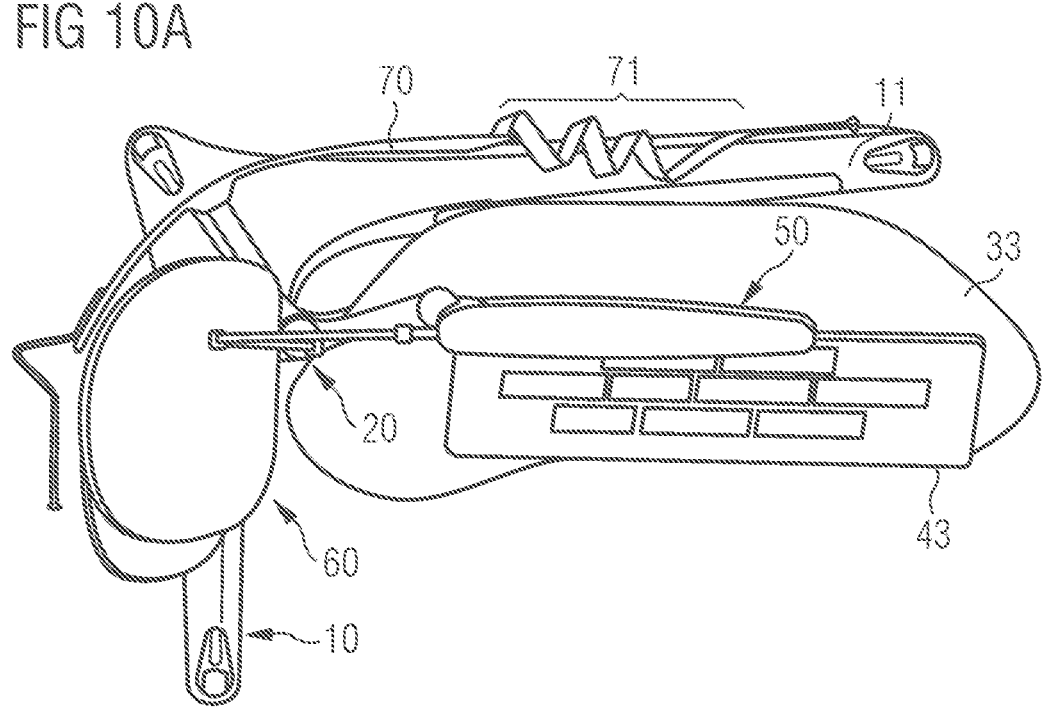
Figure 10B:
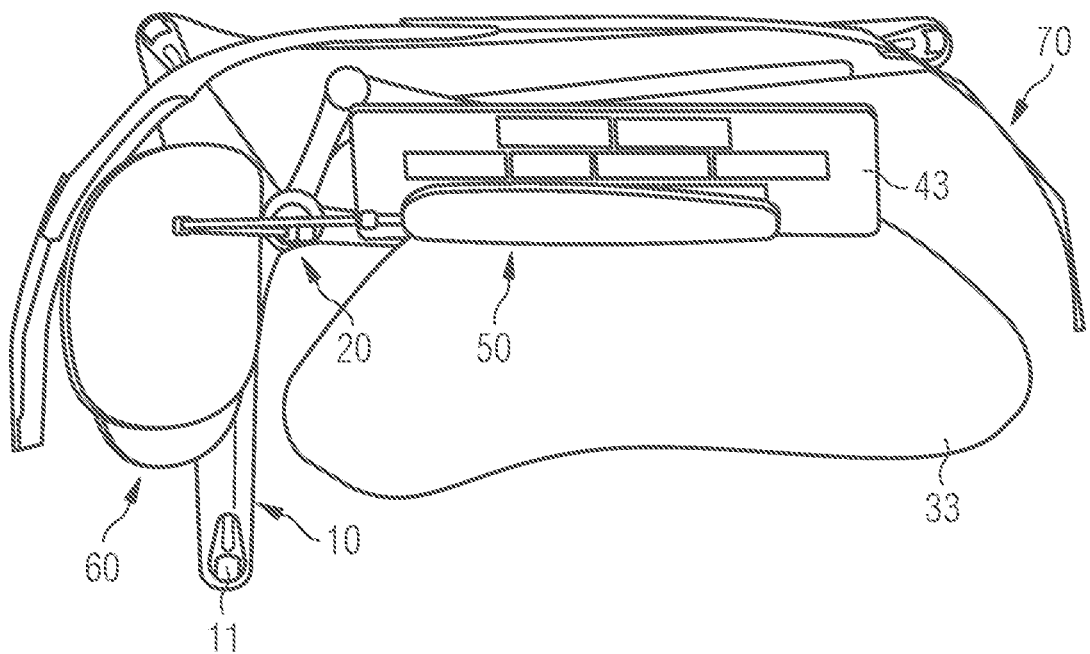

FIG. 7 shows a detail of an example of a workcell, in particular a section of the upper part 22 of column 20 with the second joint element 41 to which the second support structure 40 is attached. The second support structure 40 is shown with several carriers 42, which are connected to each other via one or more (not shown) further joint elements 44. The support structure 40 ends in a mounting 45 for a screen 43, where the mounting 45 is also hinged to the corresponding carrier 42, for example, in particular via a joint element 44 (not shown) with one or more degrees of freedom.

At least one motion sensor or position sensor 47 is provided on the mounting 45, by means of which movements, inclinations or oscillations can be detected on the support structure 40 and in particular on the mounting 45. The motion sensors or position sensors are designed as inclination sensors and/or acceleration sensors or gyro sensors, for example.

Furthermore, a stabilizing element is provided in the joint element 41, which is configured to actively compensate for movements, inclinations or vibrations of the column and/or the associated support structure in relation to a spatial position of the support structure 40. For this purpose, the stabilizing element is controlled, for example, on the basis of the movement data recorded by sensor 47. Corresponding stabilization elements can also be provided in the other joint elements 44 in order to obtain a holistically stable system. In such embodiments, the support element 40, in particular the mounting 45, remains stable even when the column is shaken, thus allowing the user to work undisturbed.

The use of such a stabilizing element is only described as an example for a monitor and can also be transferred to other work units or support structures. The movements, inclinations or vibrations of the column and/or the associated support structure may also result from movements, inclinations or vibrations of other components attached to the column, such as the foot section. In general, any movements, inclinations or vibrations in the workcell system can thus be compensated.

FIGS. 8, 9A, 9B, 10A and 10B show different views of a workcell according to the improved workstation concept. Therefore, the components already described are not repeated.

In addition to the components described above, a shelf element 60 is attached to the column 20 as a further supporting structure, which on the one hand enables the storage of office materials such as pens, notepads or the like and on the other hand also the storage of personal items such as a cell phone.

FIGS. 9A, 9B, 10A and 10B also show a privacy screen element 70, which can give the user a feeling of privacy. The privacy screen element 70, for example, is attached to the column 20 via another joint element. The privacy screen element can be made of different materials and vary in size. It can also consist of several parts that can be moved in relation to each other in order to adapt the size of the cover to the respective work situation. For example, a foldable section 71 of the privacy screen element 70 is shown, which can also be used to adapt the dimension of the cover to the respective work situation. As can be seen from the different views, the curvature and/or length of the privacy shield element can be changed.

In different embodiments the workcell can also be equipped with a control unit. The control system is configured, for example, to control a movement of at least one of the joint elements 31, 41 in response to the activation of sensors by the user. Alternatively or additionally, the control is configured to follow a user-initiated movement of one of the joint elements and/or one of the support structures on the basis of at least one signal from a movement sensor of the workcell. Such a motion sensor is for example a tilt sensor and/or an acceleration sensor and/or a gyro sensor. Furthermore, alternatively or additionally, the control can be configured to set stored configurations of at least one of the joint elements and/or at least one of the support structures in response to a selection by the user.

Further possibilities for the use of the control are not excluded thereby. In particular, the control can also be used to adjust the height of the column, if an electromechanical drive is provided, and/or to control other components connected to the workcell, such as the lamp element. For this purpose, simple tactile sensors can also be provided, which are evaluated by the control system. However, height adjustment and/or the control of further components can also be implemented in a separate control which is at least partially independent of the control of the joint elements. The control is e.g. attached to one of the support structures or housed in the base structure.

The employed sensors can also include optical sensors, such as imaging sensors like 2D or 3D camera sensors. Such sensors can, for example, detect and evaluate the movements of a user in order to initiate or support adjustment processes.

REFERENCE LIST

10 base structure
11 Struts
13 Support surfaces
20 column
21 lower part
22 upper part
30, 40 Support structure
31, 41 Joint element
33 Panel
42 Strut
43 Screen
44 Hinge element
45 Mounting
47 Sensor
50 Lamp element
60 Shelf unit
70 Privacy screen element
200, 300, 400, 500, 600 Joint element
210, 310, 410, 510, 610 outer part joint element
240, 340, 440, 540 Strut
220 lever
222 Pivot
225 Pivot point
230 Spring element
320 Latching actuator
330 Control element
420, 425 Rotary elements
520 Joint
620 Rotor
630 Stator

The invention claimed is:

1. A workcell, comprising
    a base structure with at least three support surfaces;
    a column with a lower part which is connected to the base structure and with an upper part which is height-adjustable relative to the lower part;
    a first support structure which is mechanically connected to the upper part of the column via a first joint element, the first joint element allowing axial rotation of the first support structure about the column; and an at least second support structure mechanically connected to the upper part of the column via a second joint element, the second joint element allowing axial rotation of the second support structure about the column;

wherein at least one of said first and second joint elements comprises a latching mechanism configured to block movement of said joint element with respect to said column in a normal state and to release movement of said joint element during an adjustment operation initiated by a user of said workcell, wherein the latching mechanism comprises at least one electromechanical element configured to block and release the movement of the joint element.

2. The workcell according to claim 1, wherein the first joint element allows axial rotation of the first support structure about at least one further axis, which extends at an angle to the column.

3. The workcell according to claim 2, wherein the latching mechanism of the first joint element is configured to block movement of the first joint element with respect to the further axis in a normal state and to release the movement of the first joint element with respect to the further axis during an adjustment process initiated by a user of the workcell.

4. The workcell according to claim 1, wherein at least one of the first joint element and the second joint element comprises an electric motor that is are configured for electromechanical rotation of the respective one of the first joint element and the second joint element.

5. The workcell according to claim 1, wherein a panel is attached to the first support structure.

6. The workcell according to claim 1, wherein a mounting for a screen is attached to the second support structure.

7. The workcell according to claim 1, wherein at least one of the first joint element and the second joint element comprise a stabilizing element which is configured to compensate for a spatial position of the associated support structure with respect to movements, inclinations or vibrations at least one of the column and the associated support structure.

8. The workcell according to claim 1, wherein at least one of the first and second support structures comprises a respective further joint element which is arranged at a radial distance from the column.

9. The workcell according to claim 8, wherein said further joint element comprises a further latching mechanism configured to block movement of said further joint element in said normal state and to release movement of said further joint element upon a user initiated adjustment operation.

10. The workcell according to claim 1, wherein the upper part comprises a first piece and at least one second piece which is mechanically coupled to the first piece;

the first piece forms with the lower part a height adjustment arrangement; and the first and second joint elements are attached to the second piece.

11. The workcell according to claim 1, further comprising a lamp element which is fixed-to the upper part of the column.

12. The workcell according to claim 11, wherein the lamp element is fixed to a free end of the upper part, in particular in the axial direction of the column.

13. The workcell according to claim 1, further comprising a privacy screen element attached to the column.

14. The workcell according to claim 13, wherein the privacy screen element is rotatably attached to the column, in particular via an additional joint element.

15. The workcell according to claim 1, wherein the upper part comprises an electric motor that is configured to perform a height-adjustment of the upper part relative to the lower part.

16. The workcell according to claim 1, wherein the second joint element is configured to effectuate axial rotation of the second support structure about at least one further axis, which extends at an angle to the column.

17. The workcell according to claim 16, wherein the latching mechanism of the second joint element is configured to block movement of the second joint element with respect to the further axis in a normal state and to facilitate the movement of the second joint element with respect to the further axis during an adjustment process initiated by a user of the workcell.

* * * * *